United States Patent
Kanemoto (10) Patent No.: US 9,308,758 B2
(45) Date of Patent: Apr. 12, 2016

(54) INKJET RECORDING DEVICE

(71) Applicant: SEIKO EPSON CORPORATION, Tokyo (JP)

(72) Inventor: Shuichi Kanemoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/015,157

(22) Filed: Aug. 30, 2013

(65) Prior Publication Data

US 2014/0063167 A1 Mar. 6, 2014

(30) Foreign Application Priority Data

Aug. 31, 2012 (JP) ................................. 2012-191455

(51) Int. Cl.
| | | |
|---|---|---|
| *G01D 15/00* | (2006.01) | |
| *B41J 3/39* | (2006.01) | |
| *B41J 25/308* | (2006.01) | |
| *B41J 29/06* | (2006.01) | |
| *B41J 29/02* | (2006.01) | |
| *B41J 3/36* | (2006.01) | |
| *G01D 11/24* | (2006.01) | |
| *G01D 15/28* | (2006.01) | |
| *G01D 11/30* | (2006.01) | |

(52) U.S. Cl.
CPC .............. *B41J 29/06* (2013.01); *B41J 25/3088* (2013.01); *B41J 3/36* (2013.01); *B41J 29/023* (2013.01); *G01D 11/24* (2013.01); *G01D 11/30* (2013.01); *G01D 15/28* (2013.01)

(58) Field of Classification Search
CPC ..... B41J 25/3088; B41J 25/304; B41J 25/316

USPC .............. 347/108, 109, 101, 8; 346/145; 400/691, 692, 693, 693.1, 694

See application file for complete search history.

(56) References Cited

U.S. PATENT DOCUMENTS

| 2,531,880 | A | * | 11/1950 | Herring | .......................... | 248/669 |
| RE24,454 | E | * | 4/1958 | Wilson | ........................... | 108/169 |
| 3,054,200 | A | * | 9/1962 | Steinwedel | ................... | 108/117 |
| 3,216,378 | A | * | 11/1965 | Hoppe | ........................... | 108/147 |
| 4,178,106 | A | * | 12/1979 | Mailer et al. | .................... | 400/57 |

(Continued)

FOREIGN PATENT DOCUMENTS

| JP | 11-077985 A | | 3/1999 |
| JP | 11058883 A | * | 3/1999 |

(Continued)

OTHER PUBLICATIONS

The extended European Search Report for European Application No. 13182651.3 mailed Nov. 22, 2013.

*Primary Examiner* — Shelby Fidler
(74) *Attorney, Agent, or Firm* — Global IP Counselors, LLP (57) ABSTRACT

To provide an inkjet recording device that makes it possible to have a constant gap between a recording medium and the nozzle surface of an inkjet head in the direction of extension of a head support member even in a case where a print section supporting the inkjet head with bilateral anchoring via the head support member has low rigidity, the invention is provided with a print section including a left base plate and a right base plate for supporting, by bilateral anchoring via a carriage guide, an inkjet head for printing on a recording medium; and a leg movement section that is provided to the right base plate and moves the right base plate toward the left base plate to correct for a bending of the carriage guide.

7 Claims, 8 Drawing Sheets

(56) References Cited

U.S. PATENT DOCUMENTS

| | | | |
|---|---|---|---|
| 4,570,168 A * | 2/1986 | Sjordal et al. | 346/145 |
| 4,990,004 A * | 2/1991 | Kawahara et al. | 400/56 |
| 5,152,624 A * | 10/1992 | Buschmann et al. | 400/691 |
| 5,467,116 A * | 11/1995 | Nakamura et al. | 347/50 |
| 6,095,701 A * | 8/2000 | Sattler | 400/120.17 |
| 6,179,116 B1 * | 1/2001 | Noniewicz et al. | 198/632 |
| 6,389,969 B1 * | 5/2002 | Kerr | B41J 29/02 101/382.1 |
| 6,450,710 B1 * | 9/2002 | Foster et al. | 400/58 |
| 6,499,842 B1 * | 12/2002 | Kofman et al. | 347/105 |
| 6,991,332 B1 * | 1/2006 | Fan et al. | 347/109 |
| 7,589,751 B2 * | 9/2009 | Fukutome et al. | 347/138 |
| 8,100,524 B2 * | 1/2012 | Tanaka et al. | 347/104 |
| 2003/0039500 A1 * | 2/2003 | Kelley et al. | 400/59 |
| 2005/0062808 A1 * | 3/2005 | Nakazawa | 347/84 |
| 2008/0012920 A1 * | 1/2008 | Matsuda | 347/104 |
| 2009/0095182 A1 * | 4/2009 | Hanada | 101/423 |
| 2011/0167923 A1 * | 7/2011 | Van Gerven et al. | B41J 29/06 73/847 |
| 2011/0254891 A1 * | 10/2011 | Wang | B41J 19/00 347/20 |
| 2012/0019577 A1 * | 1/2012 | Izawa et al. | 347/8 |
| 2012/0019592 A1 * | 1/2012 | Chang | 347/37 |
| 2013/0093816 A1 * | 4/2013 | Balsells Mercade et al. | 347/37 |
| 2013/0314469 A1 * | 11/2013 | Chang | 347/20 |

FOREIGN PATENT DOCUMENTS

| | | | |
|---|---|---|---|
| JP | 2004133244 A * | 4/2004 | |
| JP | 2005-225041 A | 8/2005 | |
| JP | 2013159089 A * | 8/2013 | |
| WO | WO 03004279 A1 * | 1/2003 | |

* cited by examiner

INKJET RECORDING DEVICE

CROSS-REFERENCE TO RELATED APPLICATIONS

This application claims priority to Japanese Patent Application No. 2012-191455 filed on Aug. 31, 2012. The entire disclosure of Japanese Patent Application No. 2012-191455 is hereby incorporated herein by reference.

BACKGROUND

1. Technical Field

The present invention relates primarily to an inkjet recording device for printing onto a wide recording medium.

2. Background Technology

A well-known image recording device is provided with: a conveyance unit for feeding a wide recording medium along a feed path; an elongated printer body having a guide rail for guiding the scanning of a carriage loaded with a recording head for printing onto the recording medium; a support base for supporting the conveyance unit, via a pair of left and right vertical frame bodies; and a support member that is fixed to the pair of vertical frame bodies and supports the guide rail (see Patent Document 1).

Japanese Laid-open Patent Publication No. 2005-225041 (Patent Document 1) is an example of the related art.

SUMMARY

Problems to be Solved by the Invention

In the well-known image recording device (inkjet recording device), the elongated printer body (print section) retains rigidity by being provided with the support member and the like. However, in a case where the printer body is not provided with such a support member and rigidity is low, the printer body will be deformed to a shape in which a pair of leg sections spread in opposing directions and the guide rail (a head support member) bends downward. When the guide rail bends, a gap (a so-called "paper gap") between the recording medium and a nozzle surface of the recording head is no longer constant in the direction of extension of the guide rail (head support member), and thus a problem emerges in that a uniform printing quality is not obtained.

The invention addresses the problem of providing an inkjet recording device that makes it possible to have a constant gap between a recording medium and the nozzle surface of an inkjet head in the direction of extension of a head support member even in a case where a print section supporting the inkjet head with bilateral anchoring via a head support member has low rigidity.

Means Used to Solve the Above-Mentioned Problems

An inkjet recording device of the invention is characterized by being provided with: a print section having a pair of leg sections for supporting by bilateral anchoring, via a head support member, an inkjet head for printing onto a recording medium; and a leg movement section which is provided to least one of the pair of leg sections and moves the one leg section toward the other leg section.

According to this configuration, movement of the one of the pair of leg sections toward the other leg section by the leg movement section corrects for even a case where the pair of leg sections spread in opposing directions, and, in association therewith, corrects also for bending of the head support member. That is to say, in a case where the head support member has been bent commensurate with an angle $\alpha$, each of the leg sections also is tilted commensurate with the angle $\alpha$, and therefore moving either of the pair of leg sections toward the other leg section makes it possible to eliminate the tilting of each of the leg sections commensurate with the angle $\alpha$, and also makes it possible to correct for the bending of the head support member commensurate with the angle $\alpha$. As such, even in a case where the rigidity of the print section is low, the gap (paper gap) between the recording medium and a nozzle surface of the inkjet head can be kept constant in the direction of extension of the head support member.

In such a case, preferably, further provided are a medium feed mechanism for feeding the recording medium along a feed path, and a $\theta$ adjustment section that is provided to at least one of the pair of leg sections and moves the one leg section to the other leg section in the feed direction to adjust the direction of extension of the head support member in relation to the feed direction.

According to this configuration, movement of the one leg section toward the other leg section in the feed direction by the $\theta$ adjustment section makes it possible to move (rotate) the head support member in a $\theta$ direction. This makes it possible to adjust the direction of extension of the head support member to, for example, a direction forming a 90° angle to the feed direction.

In such a case, preferably, further provided are a pair of support sections for supporting the pair of leg sections, the leg movement section and the $\theta$ adjustment section alike being provided to the one leg section and one of the support sections including a placement plate on which the one leg section is placed and in which an adjustment opening is formed, the leg movement section including a correcting block projecting out at a lower surface of the leg section and a correcting screw which is screwed into the correcting block so as to perforate through in a direction orthogonal to the feed direction and a distal end of which comes to an end at an edge inner surface of the adjustment opening, and the $\theta$ adjustment section including a $\theta$-adjusting block projecting out at the lower surface of the leg section and a $\theta$-adjusting screw which is screwed into the $\theta$-adjusting block so as to perforate through in the feed direction and a distal end of which comes to an end at the edge inner surface of the adjustment opening.

According to this configuration, respectively rotating the correcting screw and the $\theta$-adjusting screw forward or reverse as appropriate on the lower surface of the one leg section makes it possible to correct for bending of the head support member and to adjust the direction of extension of the head support member ($\theta$ adjustment) in relation to the feed direction. For this reason, the correction for the bending of the head support member and the $\theta$ adjustment can be carried out by a similar operation and in one place, and thus operability can be improved.

In such a case, preferably, further provided is a parallelism adjustment section which is provided to at least one of the pair of leg sections and moves the one leg section in a height direction in relation to the other leg section to adjust the parallelism of the head support member in relation to the plane of the feed path.

According to this configuration, even in a case where the head support member has tilted diagonally in relation to the plane of the feed direction, adjustments can be made using the parallelism adjustment section so that the head support member is parallel to the plane of the feed path. As such, the paper gap can be rendered constant in the direction of extension of the head support member. Further, adjustments can be made in the direction of extension of the head support member, so that the nozzle surface of the inkjet head is parallel to the plane of the feed direction.

In such a case, preferably, each of the support sections includes a placement plate on which the leg section is placed, and the parallelism adjustment section includes a height-adjusting screw which is screwed so as to perforate through the placement plate in the vertical direction and an upper end of which comes to an end at the lower section of the leg section.

According to this configuration, rotating the height-adjusting screw forward or reverse moves the leg section up or down, and therefore it is simple to adjust the parallelism of the head support member in relation to the plane of the feed path.

In such a case, preferably, the parallelism adjustment section is provided to both of the pair of leg sections, and each of the parallelism adjustment sections includes a plurality of height-adjusting screws provided to a plurality of points spread out in the feed direction of the recording medium.

According to this configuration, a plurality of height adjustment mechanisms installed spread out in the feed direction make it possible to adjust the angle of the leg sections in relation to the placement plates in the feed direction. This makes it possible to make adjustments in the feed direction so that the nozzle surface is parallel to the plane of the feed direction.

Another inkjet recording device of the invention is characterized by being provided with: a print section having a pair of leg sections for supporting by bilateral anchoring, via a head support member, an inkjet head for printing onto a recording medium; and a leg movement section for causing a bending moment to act on the head support member, via at least one of the leg sections, so as to correct for a bending of the head support member having been bent.

According to this configuration, using the leg movement section to cause the bending moment to act on the head support member via the at least one leg section makes it possible to correct for the bending of the bent head support member. As such, even in a case where the rigidity of the print section is low, the gap between the recording medium and a nozzle surface of the inkjet head can be kept constant in the direction of extension of the head support member.

BRIEF DESCRIPTION OF THE DRAWINGS

Referring now to the attached drawings which form a part of this original disclosure:

FIGS. 5A and 5B are drawings schematically representing a bending correction in the inkjet recording device, where FIGS. 5A and 5B are drawings illustrating before the correction and after the correction, respectively;

FIGS. 6A and 6B are drawings schematically representing a θ adjustment in the inkjet recording device, where FIGS. 6A and 6B are drawings illustrating before the adjustment and after the adjustment, respectively;

FIGS. 7A and 7B are drawings schematically representing a Y-axis parallelism adjustment in the inkjet recording device, where FIGS. 7A and 7B are drawings illustrating before the adjustment and after the adjustment, respectively; and FIGS. 8A and 8B are drawings schematically representing an X-axis parallelism adjustment in the inkjet recording device, where FIGS. 8A and 8B are drawings illustrating before the adjustment and after the adjustment, respectively.

DETAILED DESCRIPTION OF EXEMPLARY EMBODIMENTS

The following describes an inkjet recording device as in an embodiment of the invention, with reference to the accompanying drawings. The present inkjet recording device is one in which a design or the like is printed (imprinted) by inkjet printing using a dye ink specifically onto cloth (original fabric) that is fed/withdrawn in a so-called reel-to-reel format. In the description that follows, a direction of forward/reverse feeding of a recording medium, which is a cloth, is set forth as the X-axis direction; a direction orthogonal to the X-axis direction is set forth as the Y-axis direction, and a direction orthogonal to both the X-axis direction and the Y-axis direction is set forth as the Z-axis direction.

Figure 1:
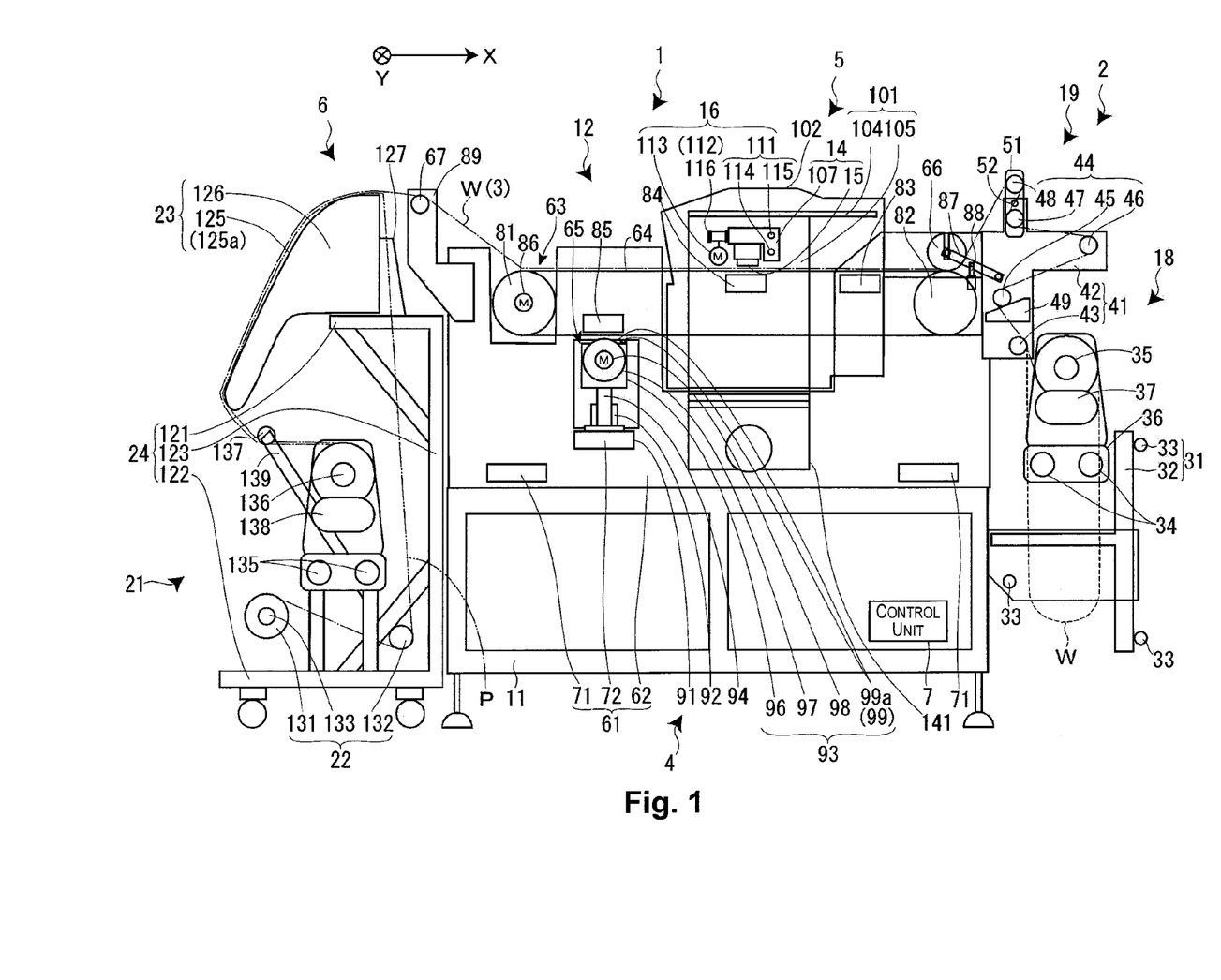
FIG. 1 is a cross-sectional structural view schematically representing an inkjet recording device as in an embodiment.

FIG. 1 is a cross-sectional structural view of the inkjet recording device. As illustrated in FIG. 1, the present inkjet recording device 1 is provided with: a feeding section 2 for feeding out a recording medium W that has been wound into a roll shape; a main device body 4 for feeding the recording medium W that has been fed out along a feed path 3, for the purpose of printing; a print section 5 that is disposed on an upper side of the main device body 4 and prints by inkjet printing onto the recording medium W in cooperation with the main device body 4; a wind-up section 6 for winding up and recovering the recording medium W that has been printed by the print section 5, on a downstream side of the main device body 4 in the feed direction; and a control unit 7 that has overarching control of these constituent devices.

The main device body 4 includes a main body chassis 11 constructed out of sheets of steel material, and a medium feed mechanism 12 that is supported by the main body chassis 11 and intermittently feeds the recording medium W in the X-axis direction by belt conveyance. The print section 5 includes a carriage unit 14 having an inkjet head 15, and a head movement mechanism 16 for reciprocatingly moving the carriage unit 14 in the Y-axis direction. The feeding section 2, in turn, includes a feeding-out unit 18 for feeding out the recording medium W, and a slack take-up unit 19 for taking up the slack of the recording medium W that has been fed out. The wind-up section 6 includes a wind-up unit 21 for winding up the recording medium W, an interleaf paper unit 22 for supplying interleaf paper P to the wind-up unit 21, and a heater unit 23 for gasifying the solvent (moisture) of a dye ink that has soaked into the recording medium W before the recording medium W is wound up; the wind-up section 6 is configured with these elements mounted onto a wind-up section chassis 24.

Fed out from the feeding-out unit 18, the recording medium W (a cloth) is stretched by the slack take-up unit 19 so that the slack is taken up, and fed into the medium feed mechanism 12. Having been fed into the medium feed mechanism 12, the recording medium W is made to be adhered to the surface and conveyed by belt. In this belt conveyance, the recording medium W is intermittently conveyed in the X-axis direction (secondary scanning) whereas the carriage unit 14 moves reciprocatingly in the Y-axis direction synchronously therewith, and ink is ejected from the inkjet head 15 (primary scanning).

After printing is carried out in this manner, the printed portion (imprinted portion) of the recording medium W is fed out to the wind-up section 6 from the medium feed mechanism 12. In the wind-up section 6, the interleaf paper P is supplied continuously from the interleaf paper unit 22 to the recording medium W that has been fed out from the medium feed mechanism 12, and the recording medium W and the interleaf paper P are stacked up onto each other and fed to the heater unit 23. In the heater unit 23, the recording medium W is heated along with the interleaf paper P, thus gasifying the solvent (moisture) of the dye ink. The imprinted recording medium W having undergone drying treatment in this manner is wound up by the wind-up unit 21 along with the interleaf paper P.

The feeding-out unit 18 includes: a feeding frame 31 including a pair of left and right (Y-axis direction) T-shaped frames 32 fixed to the main body chassis 11 as well as a plurality of rod-shaped frames 33 crossing over between the pair of T-shaped frames 32; two feeding-out-side rod bases 34 that are supported by bilateral anchoring by the pair of T-shaped frames 32 and extend in the Y-axis direction; and a pair of feeding axial projections 35 that are slidably supported by the two feeding-out-side rod bases 34. A distal end section of each of the feeding axial projections 35 is formed in a circular truncated cone shape, and relative widthwise alignment corresponding to the width of the recording medium W causes the distal end sections of the pair of feeding axial projections 35 to be fitted into the core of the roll of recording medium W, thus horizontally supporting the recording medium W.

A motor-driven width movement unit 36 is incorporated into each of the pair of feeding axial projections 35; in a case (detection) where a winding displacement in the axial direction takes place in the recording medium W, the pair of feeding axial projections 35 are moved minutely over the two feeding-out-side rod bases 34, thus preventing positional displacement of the recording medium W in the width direction in relation to the medium feed mechanism 12, i.e., preventing the recording medium W from meandering (becoming skewed) in the medium feed mechanism 12.

A motor-driven rotation unit 37 is incorporated into one of the pair of feeding axial projections 35, and the motor-driven rotation unit 37 causes the pair of feeding axial projections 35 to rotate so as to feed out, thus feeding out the recording medium W. In the present embodiment, there is a tension mode for feeding out the recording medium W while also imparting thereto a constant tension, and a slack mode for feeding out the recording medium W with the greatest possible reduction in tension, where the mode is switched depending on the recording medium W.

The tension mode is intended for normal cloth of low stretchability (the recording medium W), in which case a control system for the rotation unit 37 includes acquiring a load (the tension) and controlling the rotation unit 37 so that the load reaches a predetermined value. The slack mode, in turn, is intended for cloth of high stretchability (the recording medium W), such as, for example, stocking material, in which case a control is implemented so that the recording medium W having been fed out, once slackened downward (illustrated with a dotted line in FIG. 1), is then fed into the slack take-up unit 19. More specifically, a lower end position of the slackened recording medium W is detected, and at a point where the lower end position goes beyond a predetermined position and the slack increases, the operation for feeding out the recording medium W by the rotation unit 37 is stopped.

The slack take-up unit 19 includes: a slack take-up frame 41 composed of a pair of left and right (Y-axis direction) L-shaped frames 42 fixed to a side frame 62 of the medium feed mechanism 12 (described below), and a rod frame 43 traversing the pair of L-shaped frames 42; and a roller group 44 rotatably supported with bilateral anchoring by the pair of L-shaped frames 42. The roller group 44 includes a first roller 45, a second roller 46, a third roller 47, and a fourth roller 48, disposed in the stated order from the upstream side of the feed direction, in order to create a plurality of bends in the feed path 3 of the recording medium W that has been fed in from the feeding-out unit 18.

The first roller 45 is constituted of a roller having a high coefficient of friction, and is placed atop a pair of inclined blocks 49 with both end sections thereof attached to an inner side of each of the L-shaped frames 42. The recording medium W, the upstream side of which is slackened, is rerouted diagonally outward toward the second roller 46 at the portion where the first roller 45 is. When the recording medium W is drawn on (fed) by the intermittent feeding of the medium feed mechanism 12, the force of friction between the recording medium W and the first roller 45 causes the first roller 45 to move so as to ascend the pair of inclined blocks 49. When the feeding of the recording medium W is stopped, gravity causes the first roller 45 to descend the pair of inclined blocks and return to the original position. This imparts an appropriate tension to the recording medium W being fed, and causes the shocks of the intermittent feeding to be absorbed.

Having passed through the first roller 45, the recording medium W is put on a U-turn at the second roller 46 and arrives at the third roller 47 and the fourth roller 48. The third roller 47 and the fourth roller 48 are disposed in close proximity in the vertical direction, and are rotatably supported by a pair of bearing sections 51 with both end sections integrally formed. Each of the bearing sections 51 is rotatably supported by the L-shaped frames 42, and one of the bearing sections 51 has incorporated thereinto an angle adjustment unit 52 for adjusting the vertically directed placement angle between the third roller 47 and the fourth roller 48.

Passing through the third roller 47 and the fourth roller 48, the recording medium W is rerouted in an S-shaped manner, but this S-shaped curve can be adjusted by deformation depending on the type of recording medium W, making it possible to impart a tension suitable for the specific type of recording medium W. This eliminates any partial slackening or wrinkling for when the recording medium W is being fed into the medium feed mechanism 12. Preferably, the rollers 45, 46, 47, 48 are given a drum-shaped structure so that an outwardly directed component force acts on the recording medium W from the center.

The medium feed mechanism 12 is provided with: a main body frame 61 having the pair of left and right (Y-axis direction) side frames 62 placed atop and fixed to the main body chassis 11; a belt conveyance unit 63 which is supported by the pair of side frames 62 and includes an endless conveyance belt 64; and a belt cleaning unit 65 disposed on a lower side of the belt conveyance unit 63. The medium feed mechanism 12 is provided with a pressing roller 66 facing the belt conveyance unit 63 from above on the upstream side, and a separation roller 67 disposed diagonally above in relation to the belt conveyance unit 63 on the downstream side.

The main body frame 61 includes: the pair of side frames 62, which are constituted of thick plates; and a pair of front and rear (X-axis direction) connecting frames 71 for connecting the pair of side frames 62; and is placed atop and fixed to the main body chassis 11 at the portion where the pair of side frames 62 are. The main body frame 61 also includes a support frame 72 that is positioned between the pair of connecting frames 71 and connects the pair of side frames 62, and that supports the belt cleaning unit 65. A cut-out section for attaching the belt conveyance unit 63 and a cut-out section for attaching the print section 5 are provided as appropriate to each of the side frames 62; also formed is an opening for inspecting the belt cleaning unit 65.

The belt conveyance unit 63 includes a drive pulley 81 positioned on the downstream side in the feed direction, a driven pulley 82 positioned on the upstream side in the feed direction, and the endless conveyance belt 64, which spans between the drive pulley 81 and the driven pulley 82. The belt conveyance unit 63 includes a first guide plate 83 that is positioned in the vicinity of the driven pulley 82 and guides the travel of the conveyance belt 64, a second guide plate 84 that is positioned directly below the print section 5 and guides the travel of the conveyance belt 64, and a third guide plate 85 that is positioned directly above the support frame 72 and guides the travel of the conveyance belt 64 that has wrapped around to the reverse side.

The first guide plate 83 and the second guide plate 84 span across the pair of side frames 62 while disposed in such a manner that the surfaces of each are flush with each other (on the same horizontal plane), and also function as a part of the main body frame 61. The first guide plate 83 guides so that the (upper side of) the conveyance belt 64 that is immediately behind away from the driven pulley 82 travels horizontally, and the second guide plate 84 guides so as to prevent the (upper side of) the conveyance belt 64 that is positioned in a print region from experiencing slackening. As such, the conveyance belt 64 that is positioned directly above the second guide 84 plate functions as a platen. Additionally, the third guide plate 85 guides so as to hold the conveyance belt 64 receiving an upwardly pushing force because of the belt cleaning unit 65 (to be described in greater detail below).

The drive pulley 81 and the driven pulley 82 are rotatably supported by the pair of side frames 62, via a dedicated bearing, and a conveyance motor 86 for intermittently causing the conveyance belt 64 to travel is connected to one of the axial ends of the drive pulley 81. The conveyance belt 64 is constituted of a wide, special belt that is adhesive (has been adhesive-treated) on the outer peripheral surface (the surface); the recording medium W adheres thereto and is fed in the X-axis direction. This causes the recording medium W to be fed (intermittently fed) and printed on, without producing a turn or the like, directly below the print section 5.

The pressing roller 66, by which the recording medium W having been fed in from the slack take-up unit 19 is adhered to the conveyance belt 64, is disposed on an upper side of the driven pulley 82. The pressing roller 66 is rotatably supported by a distal end section of a pair of support frames 87 rotatably supported by the side frames 62. The pressing frame 66 has a predetermined elasticity and weight, and is caused by gravity to push the recording medium W against the conveyance belt 64 at directly above the driven pulley 82. That is to say, the pressing roller 66 and the driven pulley 82 function as nip rollers sandwiching the conveyance belt 64, and continuously adhere the recording medium W to the traveling conveyance belt 64. An air cylinder 88 for causing the support frames 87 to rotate is connected to an intermediate position of each of the support frames 87, and synchronously driving the pair of air cylinders 88 causes the pressing roller 66 to be pulled apart from the conveyance belt 64.

Meanwhile, the separation roller 67, which peels the printed recording medium W away from the conveyance belt 64 and feeds the recording medium W into the wind-up section 6, is disposed diagonally above the drive pulley 81. The separation roller 67 is rotatably supported by a pair of sub-frames 89 that extend from the side frames 62. Here, the separation roller 67 is for pulling the recording medium W in a relative fashion away from the conveyance belt 64 which revolves about the drive pulley 81 and wraps around to the reverse side, but in actual operation, the force of pulling away from the conveyance belt 64 would vary depending on the type of recording medium W. For this reason, depending on the recording medium W, in some instances peeling away begins at a position where the conveyance belt 64 begins revolution, and in other instances peeling begins at a position where revolution has progressed a certain extent. However, were the point of pulling away to wrap around to the reverse side, there would be the potential for the recording medium W to be caught up into the conveyance belt 64.

Therefore, in the present embodiment, the angle of the recording medium W being fed into the separation roller 67 from the conveyance belt 64 is positionally detected, and the wind-up unit 21 is driven to wind up on the basis of the detection result of this positional detection, to prevent the point of pulling away from wrapping around to the reverse side of the conveyance belt 64.

The belt cleaning unit 65 is supported by the support frame 72 on the lower side of the conveyance belt 64, and extends in the Y-axis direction so as to traverse the conveyance belt 64. The belt cleaning unit 65 is provided with a unit base 91 placed atop the support frame 72, a vertical motion cylinder 92 provided so as to be erected on the unit base 91, a cleaning unit main body 93 vertically moved by the vertical motion cylinder 92, and a pair of vertical motion guides 94 for guiding the vertical motion of the cleaning unit main body 93.

The cleaning unit main body 93 includes a box-shaped cleaning vessel 96 that extends in the Y-axis direction and stores a cleaning solution, a rotating brush 97 accommodated in the cleaning vessel 96, a cleaning motor 98 for rotating the rotating brush 97, and a wiper for scraping off in a relative fashion any cleaning solution that has attached to the cleaning belt 64. The wiper 99 is attached to an inner side of the cleaning vessel 96 and is constituted of two wiping blades 99 disposed in a V-shaped manner, and comes into contact with the traveling conveyance belt 64 to scrape off the cleaning solution. Any cleaning solution ultimately remaining on the conveyance belt 64 will be wiped off with a waste cloth. Preferably, the cleaning solution is cycled to an external tank and back while being filtered.

The belt cleaning unit 65 regularly cleans the conveyance belt 64 because lint and dust attach over time to the conveyance belt 64, which is adhesive. This cleaning task includes raising the cleaning unit main body 93 to a position at which the rotating brush 97 and the wiper 99 are in contact with the conveyance belt 64, and thereafter causing the conveyance belt 64 to travel and also rotating the rotating brush 97 so as to be in reverse in relation to the direction of travel. At this time, the conveyance belt 64 is pushed on by the third guide plate 85, and comes into contact with the rotating brush 97 while still maintained in a horizontal posture. This causes the (adhesive surface of the) conveyance belt 64 to be continuously brushed clean. Preferably, the cleaned conveyance belt 64 undergoes an adhesive treatment to recover the adhesive force.

The print section 5 is provided with a printer frame 101 that extends in the Y-axis direction so as to straddle the feed path 3 (the belt conveyance unit 63), the head movement mechanism 16 supported by the printer frame 101, the carriage unit 14 that is mounted onto the head movement mechanism 16 and moves reciprocatingly in the Y-axis direction, and a printer cover 102 for covering these elements. Though not depicted in particular, a cleaning unit and cap unit for maintaining the inkjet head 15 are mounted onto the print section 5. A so-called paper gap (work gap) in the print section 5 ranges in thickness among the various types of recording medium W, and therefore is adjusted by vertically moving the entire print section 5 in relation to the main device body 4 (the medium feed mechanism 12).

The printer frame 101 includes a beam-shaped frame 104 made of sheet metal that extends in the Y-axis direction as well as a pair of erected frames 105 made of sheet metal that support the beam-shaped frame 104 at both end sections, and is supported by the side frames 62 at the portion where the erected frames 105 are. The printer cover 102 is attached to the printer frame 101.

The carriage unit 14 includes: the inkjet head 15, which has nozzle columns of a plurality of colors for color printing; and a carriage 107 for holding the inkjet head 15 so that a nozzle surface 15*a* (see FIGS. 7A and 7B) faces downward. Each of the colors of dye ink supplied to each of the nozzle columns is supplied from an ink tank of a so-called off-carriage.

The head movement mechanism 16 includes a carriage guide 111 for supporting the carriage unit 14 by cantilever so as to be slidable in the Y-axis direction, a belt conduction mechanism 112 for reciprocatingly moving the carriage guide 111, and a carriage motor 113 for driving the belt conduction mechanism 112. The carriage guide 111 is composed of a lower main guide 114 and an upper sub-guide 115; the main guide 114 and the sub-guide 115 are supported (held) by (a leg section of) the pair of erected frames 105 at both end sections thereof. The belt conduction mechanism 112 has a timing belt 116, and a part of the timing belt 116 is fixed to (the carriage 107 of) the carriage unit 14. The "head support member" in the claims is constituted of the carriage guide 111.

When the timing belt 116 is made to travel forward by the carriage motor 114, the carriage unit 14 is guided by the carriage guide 111 and moves reciprocatingly in the Y-axis direction. The moving position of the carriage guide 111 is detected by a linear encoder, and each of the colors of dye ink is selectively ejected from the inkjet head 15 on the basis of the detection result as well as print data. The recording medium W is thereby printed (imprinted).

The wind-up section 6 is provided with the wind-up section chassis 24 connected to the main body chassis 11 so as to be detachable in the X-axis direction, the heater unit 23 supported by an upper section of the wind-up section chassis 24, and the wind-up unit 21 and the interleaf paper unit 22 both supported by a lower section of the wind-up section chassis 24. Formats for the imprinted recording medium W include a format in which a thick recording medium W from which the ink is not traveling to a back side is wound up without any alteration, and a format in which the interleaf paper is placed on a thin recording medium W from which the ink is prone to be traveling to the back side and then same are wound up; the wind-up section 6 of the embodiment is designed to be capable of addressing both formats. A case where the latter format is employed shall now be described below.

The wind-up section chassis 24 includes an upper horizontal frame section 121, a lower horizontal frame section 122, and a vertical frame section 123 connecting the upper horizontal frame section 121 and the lower horizontal frame section 122, and is configured by combining extruded aluminum material in a criss-cross fashion. At the portion where the vertical frame section 123 is, the wind-up section chassis 24 is detachably connected to the main body chassis 11.

The heater unit 23 includes a heat dissipation plate 125 having an arc-shaped heat dissipation surface 125*a*, and a heater 126 bonded to inside the heat dissipation plate 125. The heater unit 23 is attached to the upper horizontal frame section 121 by a left and right fixing member 127 provided to the upper horizontal frame section 121 in a state where an upper half section thereof has been placed on the upper horizontal frame section 121. An upper end section of the heat dissipation plate 125 is disposed at a position close to the separation roller 67 and slightly lower than the separation roller 67. The upper end section of the heat dissipation plate 125 is shaped so as to bend downward in an arc-shaped manner in order to reroute the interleaf paper P being guided into this portion from below.

Having passed through the separation roller 67, the recording medium W is overlapped with the interleaf paper P being fed in from below at the upper end section of the heat dissipation plate 125, and is fed downward along the arc-shaped outer surface (the heat dissipation surface 125*a*) of the heat dissipation plate 125. The recording medium W and the interleaf paper P, which are fed in the vertical direction while in sliding contact with the heat dissipation surface 125*a*, are continuously heated by the heater 126. This heating gasifies the solvent (moisture) of the dye pigment that has soaked into the recording medium W, thus fixing the dye to the cloth.

The interleaf paper unit 22 includes an interleaf paper roller 131 for feeding out a roll of the interleaf paper P, and a guide bar 132 for rerouting the fed-out interleaf paper P toward the upper end section of the heat dissipation plate 125. The guide bar 132 is fixed to a diagonal portion connecting the lower horizontal frame section 122 and the vertical frame section 123. The interleaf paper roller 131 is supported by a front section of the lower horizontal frame section 122, via a pair of bearing units 133 by which a braking mechanism is incorporated. This pair of bearing units 133 causes the interleaf paper P to be fed out without producing slackening.

The wind-up unit 21 is similar to the feeding-out unit 18 in including two winding-side rod bases 135 that are supported by a rear section of the lower horizontal frame section 122 and extend in the Y-axis direction, and a pair of wind-up axial projections 136 slidably supported by the two winding-side rod bases 135. The wind-up unit 21 also includes a tension roller 137 that is positioned on the feed path 3 between the lower end section of the heat dissipation plate 125 and the pair of wind-up axial projections 136, and imparts tension to the recording medium W and to the interleaf paper P.

A distal end section of each of the wind-up axial projections 136 is formed in a circular truncated cone shape, and relative widthwise alignment corresponding to the width of the recording medium W causes the distal end sections of the pair of wind-up axial projections 136 to be fitted into a wind-up core around which the recording medium W is wound up, thus horizontally supporting the recording medium W. A motor-driven rotation unit 138 is incorporated into one of the pair of wind-up axial projections 136, and the motor-driven rotation unit 138 causes the pair of wind-up axial projections 136 to rotate so as to wind up, thus simultaneously winding up both the recording medium W and the interleaf paper P. The rotation unit 138 is controlled on the basis of the detection of the angle of the recording medium W being fed into the separation roller 67 in the vicinity of the separation roller 67, as stated above.

The tension roller 137 is rotatably supported by a distal end section 139 of a pair of rotating arms 139 rotatably supported by the rear section of the lower horizontal frame section 122. The tension roller 137 is in contact with and rotating on the recording medium W being wound up around the wind-up core as well as the interleaf paper P side of the interleaf paper P side, and gravity urges downward rotation of the recording medium W and the interleaf paper P. This imparts an appropriate tension to the recording medium W and to the interleaf paper P, and causes the recording medium W and the interleaf paper P to be wound up around the wind-up core so as to be wound tight.

Figure 2:
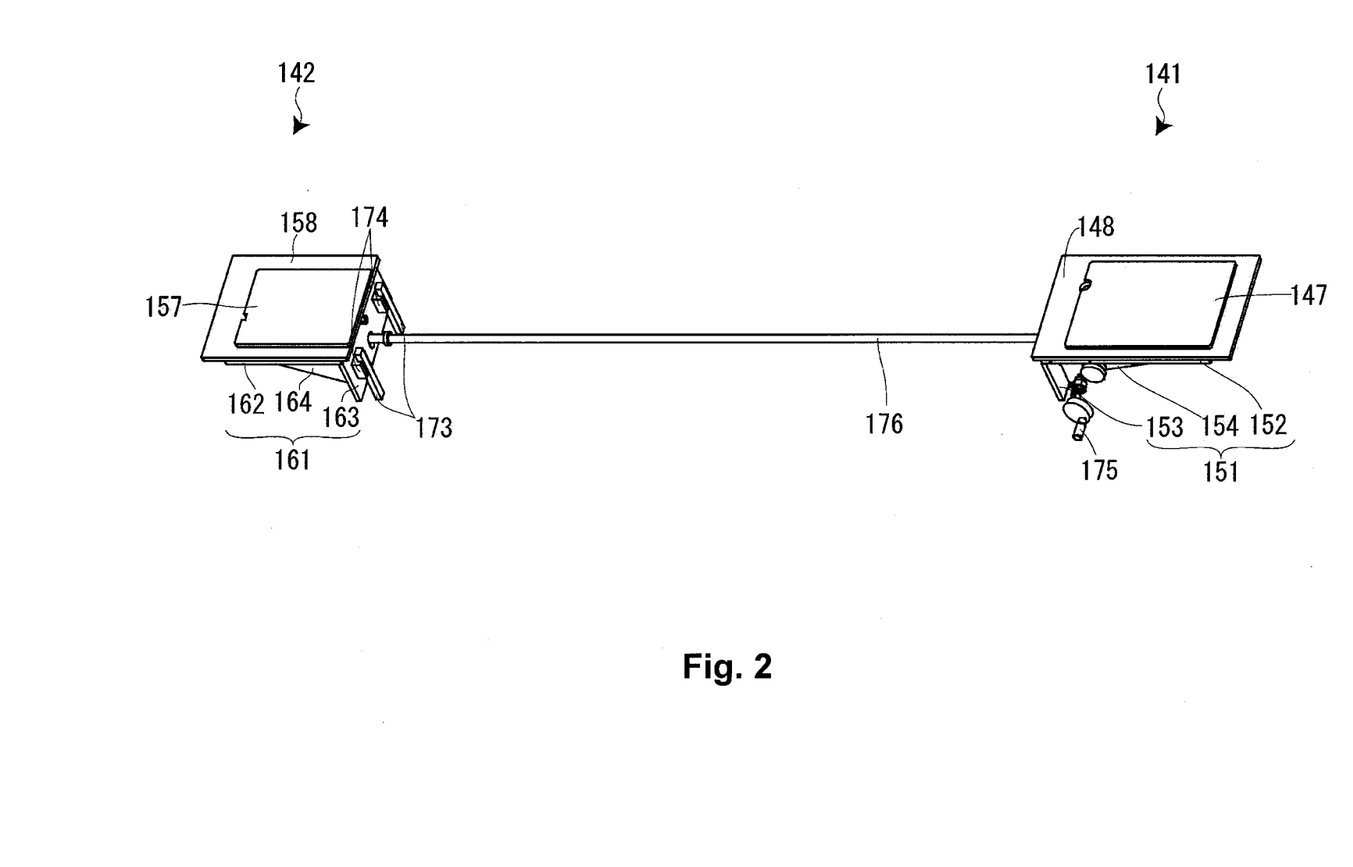
FIG. 2 is a perspective view in which a left support section and a right support section for supporting a print section in the inkjet recording device are viewed from the downstream side of a feed direction.

A left support section 141 and right support section 142 that are provided to the pair of left and right side frames 62 of the medium feed mechanism 12 and support the print section 5 shall now be described, as shall a mechanism for adjusting the position of attachment of the print section 5 to the left support section 141 and the right support section 142, with reference to FIGS. 2 to 4.

The left support section 141 includes: a left placement plate 148 on which a left base plate 147 serving as a base of the left lower end section of the print section 5, i.e., the erected frame 105 on the left side; and a left bracket section 151 for supporting the left placement plate 148 from below. The left bracket section 151 is constituted of a horizontal board 152 for supporting the left placement plate 148, a vertical board 153 coming down from one of the end sections of the horizontal plate 152, and a pair of reinforcing boards 154 provided spaced apart in the X-axis direction on an inner side of the horizontal board 152 and the vertical board 153.

Figure 3:
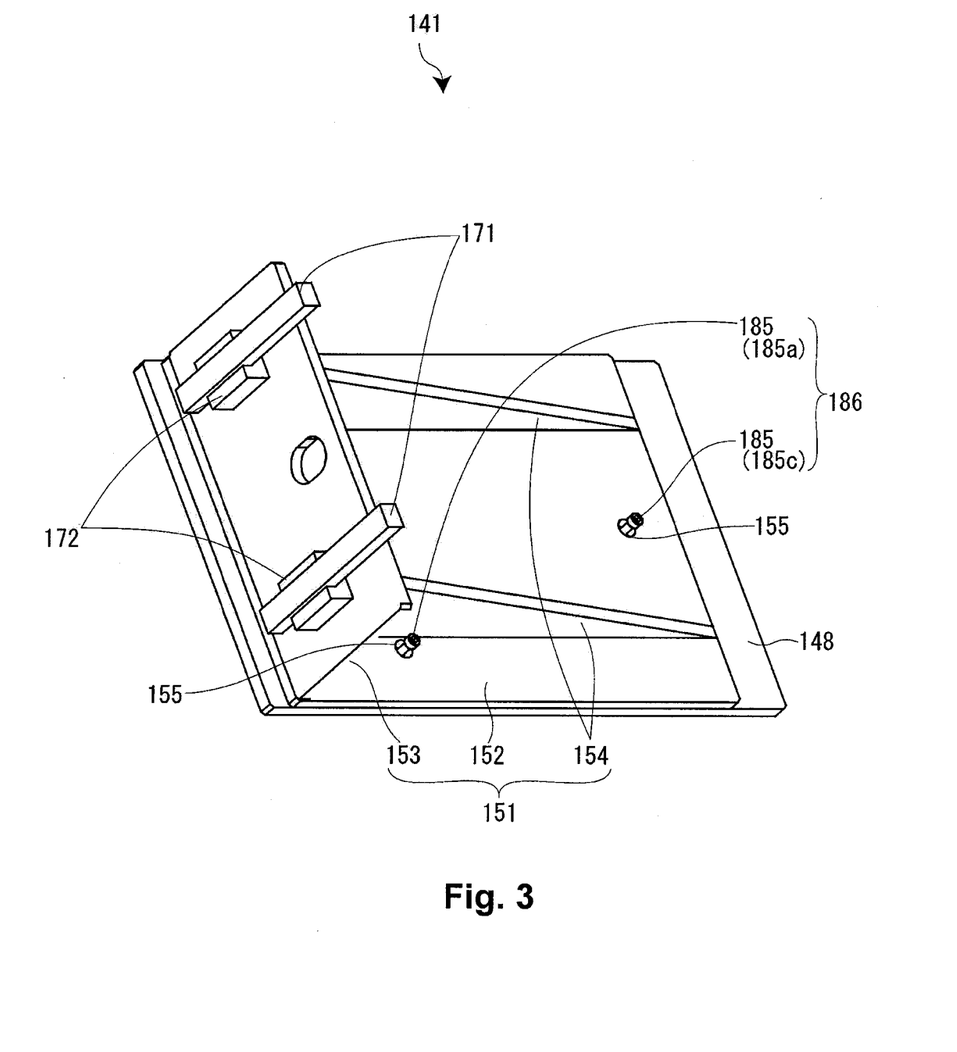
FIG. 3 is a perspective view in which the left support section is viewed from below.

Formed in the horizontal board 152 are through holes 155 (loose holes) into which height-adjusting screws 185 (described below) are loosely inserted, three at three different points, namely, two at two points (though only one point is illustrated in FIG. 3) that are end sections closer to the vertical board 153 and are arranged side by side in the X-axis direction on both outer sides of the pair of reinforcing boards 154, and one at one point that is an end section farther from the vertical board 153 and is an intermediate section of the pair of reinforcing boards 154. Additionally, formed in the left placement plate 148 are height adjustment holes 156 (see FIGS. 7A and 7B) through which the height-adjusting screws 185 are screwed so as to perforate through, at three points corresponding to each of the through holes 155.

The right support section 142 includes: a right placement plate 158 on which a right base plate 157 that, with some exception, has substantially the same form as that of the left support section 141 and serves as a base of a right lower end section of the print section 5, i.e., the erected frame 105 on the right side is placed; and a right bracket section 161 for supporting the right placement plate 158 from below. The right bracket section 161 is constituted of a horizontal board 162 for supporting the left placement plate 158, a vertical board 163 coming down from one of the end sections of the horizontal plate 162, and a pair of reinforcing boards 164 provided spaced apart in the X-axis direction on an inner side of the horizontal board 162 and the vertical board 163.

Figure 4:
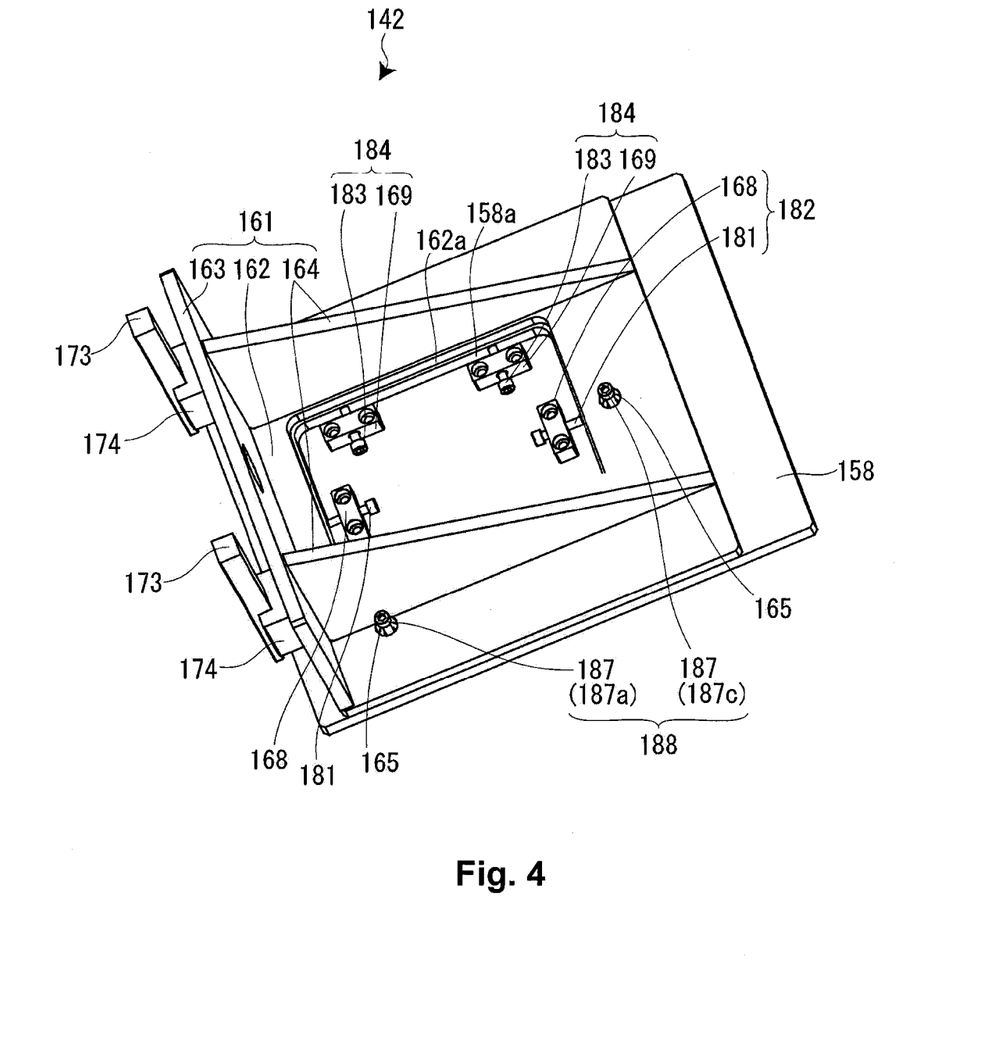
FIG. 4 is a perspective view in which the right support section is viewed from below.

Formed in the horizontal board 162 are through holes 165 (loose holes) into which height-adjusting screws 187 (described below) are loosely inserted, three at three different points, namely, two at two points (though only one point is illustrated in FIG. 4) that are end sections closer to the vertical board 163 and are arranged side by side in the X-axis direction on both outer sides of the pair of reinforcing boards 164, and one at one point that is an end section farther from the vertical board 163 and is an intermediate section of the pair of reinforcing boards 164. Additionally, formed in the left placement plate 158 are height adjustment holes 156 (see FIGS. 7A and 7B) through which the height-adjusting screws 187 are screwed so as to perforate through, at three points corresponding to each of the through holes 165.

Further formed in the horizontal board 162 of the right support section 142 is a rectangular lower adjustment opening 162a, between the pair of reinforcing boards 164. The four sides of the lower adjustment opening 162a extend in either the X-axis direction or the Y-axis direction. An upper adjustment opening 158a that is matched to the lower adjustment opening 162a is formed in the right placement plate 158. Facing downward from the lower adjustment opening 162a and the upper adjustment opening 158a are six adjustment blocks projecting out at a lower surface of the right base plate 157. The six adjustment blocks are constituted of a pair of correcting blocks 168 provided spaced apart in the Y-axis direction so as to face each other, and two sets of θ-adjusting blocks 169 (though only one of the sets is illustrated in FIG. 4), pairs of the θ-adjusting blocks 169 that are provided spaced apart in the X-direction so as to face each other being arranged side by side in the Y-axis direction. As will be described below, the six adjustment blocks constitute a leg movement section 182 (described below) and a θ adjustment section 184.

A pair of slide guides 171 fixed to an outer surface of the sub-frame 62 on the left side are provided to the vertical board 153 of the left support section 141, as are a pair of sliders 172 that engage with the slider guides 171. Similarly, a pair of slide guides 173 fixed to an outer surface of the sub-frame 62 on the right side are provided to the vertical board 163 of the right support section 142, as are a pair of sliders 174 that engage with the slider guides 173. Forward or reverse rotation of an operation handle 175 provided to the left support section 141 causes the left support section 141 to move vertically in relation to the sub-frame 62 on the left side, and the right support section 142 is moved vertically in relation to the sub-frame 62 on the right side synchronously with the vertical movement of the left support section 141 by an interlocking mechanism 176. This makes it possible to vertically move the entirety of the print section 5 in relation to the side frames 62 (the medium feed mechanism 12), and allows for the paper gap (work gap) in the print section 5 to be adjusted.

Provided as the mechanism for adjusting the position of attachment of the print section 5 are: the leg movement section 182, which is constituted of the pair of correcting blocks 168 and a correcting screw 181 that screws so as to perforate through in the Y-axis direction in relation to each of the correcting blocks 168; the θ adjustment section 184, which is constituted of the two sets of θ-adjusting blocks 169 and a θ-adjusting screw 183 that screws so as to perforate through in the X-axis direction in relation to each of the θ-adjusting blocks 169; a left parallelism adjustment section 186 constituted of the three height-adjusting screws 185 that screw into the height adjustment holes 156 formed at three points of the left placement plate 148; and a right parallelism adjustment section 188 constituted of the three height-adjusting screws 187 that screw into the height adjustment holes 166 formed at three points of the right placement plate 158.

In the leg movement sections 182, each of the correcting screws 181 has a knob head, and a distal end of a shank comes to an end at an edge inner surface of the upper adjustment opening 158a (a side inner surface that extends in the X-axis direction). Loosening the correcting screw 181 on the left side (the side closer to the vertical board 163) in a relative fashion from the correcting block 168 on the left side and also screwing the correcting screw 181 on the right side (the side farther from the vertical board 163) in a relative fashion into the correcting block 168 on the right side causes the right base plate 157 to which the correcting blocks 168 are attached to move minutely to the left in relation to the right placement plate 158 fixed to the side frame 62 via the right bracket section 161, the slider 174, and the slide guide 173. This makes it possible to minutely move the right base plate 157 toward the left base place 147. Conversely, screwing the correcting screw 181 on the left side in a relative fashion into the correcting block 168 on the left side and also loosening the correcting screw 181 on the right side in a relative fashion from the correcting block 168 on the right side causes the right base plate 157 to which the correcting blocks 168 are attached to move minutely to the right in relation to the right placement plate 158. This makes it possible to minutely move the right base plate 158 in the direction going away from the left base plate 147.

In the θ adjustment sections 184, each of the θ-adjusting screws 183 is configured similarly with respect to the correcting screws 181 in having a knob head and in that a distal end of a shank comes to an end at an edge inner surface of the upper adjustment opening 158a (a side inner surface that extends in the Y-axis direction). Loosening the θ-adjusting screw 183 on the upstream side in the feed direction in each of the sets in a relative fashion from the θ-adjusting block 169 on the upstream side and also screwing the θ-adjusting screw 183 on the downstream side in each of the sets in a relative fashion into the θ-adjusting block 169 on the downstream side causes the right base plate 157 to which the θ-adjusting blocks 169 are attached to move minutely to the upstream side in relation to the right placement plate 158. Conversely, screwing the θ-adjusting screw 183 on the upstream side in the feed direction in each of the sets in a relative fashion into the θ-adjusting block 169 on the upstream side and also loosening the θ-adjusting screw 183 on the downstream side in each of the sets in a relative fashion into the θ-adjusting block 169 on the downstream side causes the right base plate 157 to which the θ-adjusting blocks 169 are attached to move minutely to the downstream side in relation to the right placement plate 158. This makes it possible to minutely move the right base place in the X-axis direction in relation to the left base plate 147. In the present embodiment, two sets of the θ-adjusting blocks 169 are provided, but merely one set can also be provided.

The left parallelism adjustment section 186 and the right parallelism adjustment section 188 are similarly configured, and therefore the left parallelism adjustment section 186 shall be described below as a representative example. The left parallelism adjustment section 186 is constituted of: the through holes 155 formed at the two points arranged side by side in the X-axis direction on both outer sides of the pair of reinforcing boards 154, of the through holes 155 that are formed at the three points of the horizontal board 152, as well as the two height-adjusting screws 185 perforating through the height adjustment holes 156 corresponding thereto (hereinafter also "the first height-adjusting screw 185a" and "second height-adjusting screw 185b", respectively); and the through hole 155 formed at the one point that is the intermediate section of the pair of reinforcing boards 154, as well as the one height-adjusting screw 185 perforating through the height adjustment hole 156 corresponding thereto (hereinafter also "the third height-adjusting screw 185c"). Each of the height-adjusting screws is configured similarly with respect to the correcting screws 181 and the θ-adjusting screws 183 in having a knob head and in that a distal end of a shank comes to an end at a lower surface of the left base plate 147. Screwing the three height-adjusting screws 185 into the left placement plate 148 causes the left base plate 147 to rise in relation to the left placement plate 148, and conversely loosening the three height-adjusting screws 185 from the left placement plate 148 causes the left base plate 147 to lower in relation to the left placement plate 148.

Furthermore, in relation to the left base plate 147, the third height-adjusting screw 185c comes to an end at a substantially intermediate section in the X-axis direction, whereas the first height-adjusting screw 185a and the second height-adjusting screw 185b come to an end at both end sections in the X-axis direction (the upstream-side end section and downstream-side end section in the feed direction). For this reason, screwing one of either the first height-adjusting screw 185a or the second height-adjusting screw 185b into the left placement plate 148 and loosening the other from the left placement plate 148 makes it possible to adjust the angle of the left base plate 147 in relation to the left placement plate 148 in the X-axis direction.

Figure 5A:
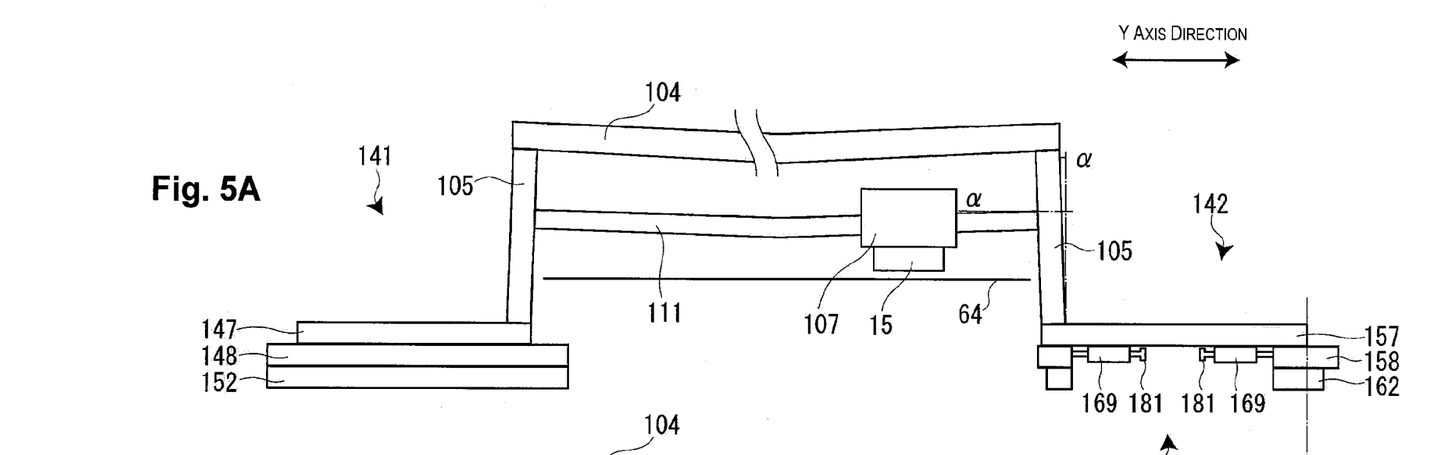

A correction for bending of the carriage guide 111 by the leg movement sections 182 shall now be described with reference to FIGS. 5A and 5B. The main guide 114 and the sub-guide 115 are described together as the carriage guide 111. FIG. 5A illustrates a state where the print section 5 has been placed on the left support section 141 and the right support section 142, i.e., a state where the left placement plate 148 and the right placement plate 158 have been attached to lower surfaces of the left base plate 147 and the right base plate 157 of the print section 5, and respectively placed on the horizontal board 152 of the left bracket section 151 and the horizontal board 162 of the right bracket section 161, and the left placement plate has been aligned with and then bolt-fastened to the horizontal board 152 of the left bracket section 151. The right placement plate 158, however, is not fixed to the horizontal board 162 of the right bracket section 161, and is allowed to move minutely.

In FIG. 5A, the print section 5 has the printer frame 101 composed of the beam-shaped frame and the pair of erected frames 105 supporting same, as described above, but because the lower end sections of the pair of erected frames 105 are not connected, the rigidity of the print section 5 overall is lowered. For this reason, when the print section 5 is placed on the left support section 141 and the right support section 142, the pair of erected frames 105 adopt an inverted V-shape in which the lower end sections spread apart, and also the carriage guide 111 enters a downwardly bent state. That is to say, the carriage guide 111 is bent commensurate with an angle α at both end sections held by the erected frames 105, and each of the erected frames 105 also tilts commensurate with the angle α.

Figure 5B:
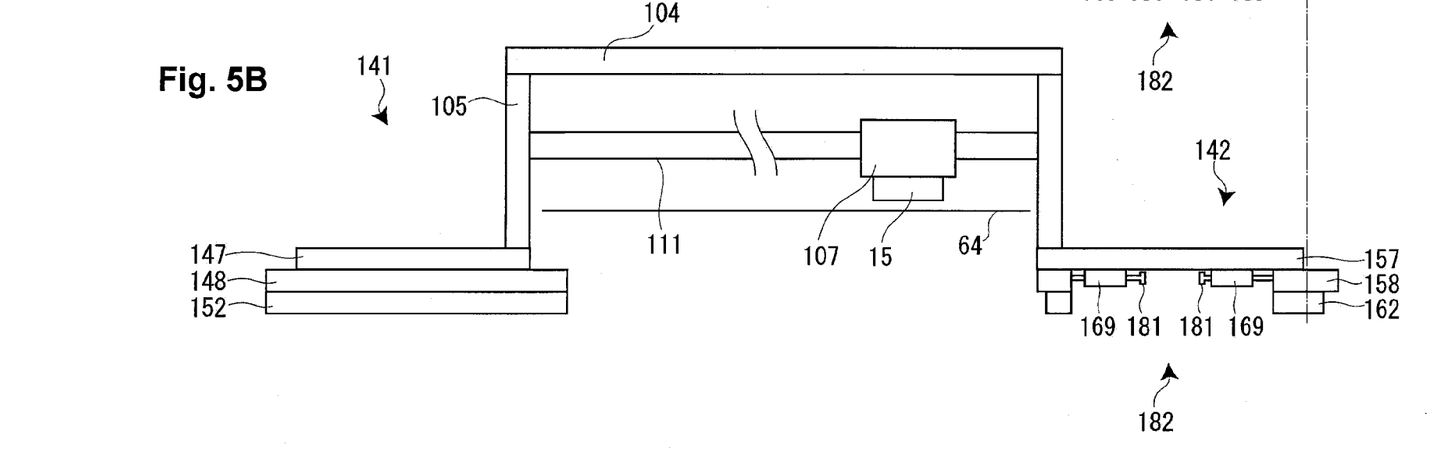

In this state, as illustrated in FIG. 5B, the correcting screws 181 of the leg movement sections 182 are rotated forward or reverse and the right base plate 157 is moved minutely toward the left base plate 147. This makes it possible to eliminate the tilting of the erected frames 105 commensurate with the angle α, and makes it possible to also correct the bending of the carriage guide 111 commensurate with the angle α. In other words, minute movement of the right base plate 157 toward the left base plate 147 by the leg movement sections 182 causes a bending moment to act on the carriage guide 111 via the right base plate 157 so as to correct the bending of the downwardly bent carriage guide 111. That is to say, a bending moment in which tensile stress is produced upward and compressive stress is produced downward acts on the carriage guide 111. This manner of correcting the bending of the carriage guide 111 makes it possible to achieve a constant paper gap in the Y-axis direction (a main scanning direction) even in a case where the print section 5 has low rigidity. The leg movement sections 182 can also be provided to the left base plate 147, thus allowing for an operation to correct bending to be carried out on both the left and right sides.

Figure 6A:
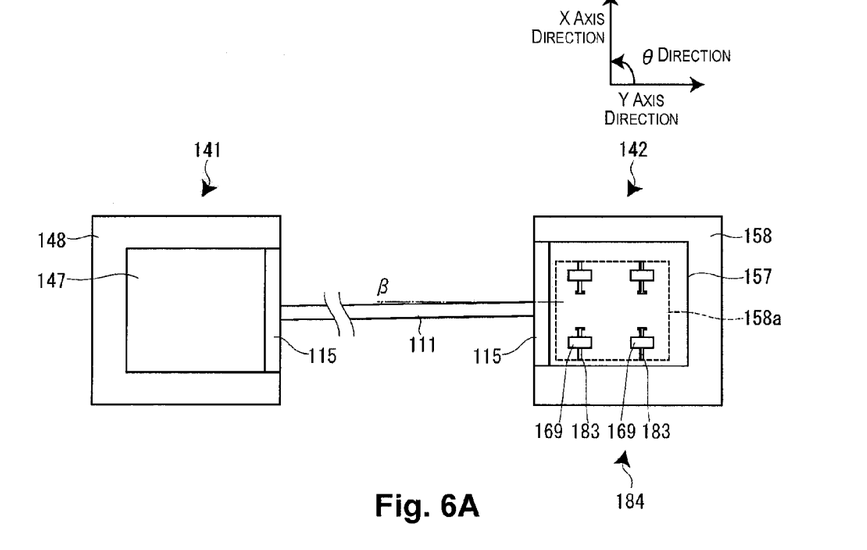

Next, adjustment of the direction of extension of the carriage guide 111 in a θ direction (θ adjustment) by the θ adjustment sections 184 shall now be described, with reference to FIGS. 6A and 6B. FIG. 6A, similarly with respect to FIG. 5A, illustrates a state where the print section 5 has been placed on the left support section 141 and the right support section 142, and the left placement plate 148 has been fixed to the horizontal board 152 of the left bracket section 151. In FIG. 6A, the carriage guide 111 tilts in the θ direction commensurate with an angle θ in relation to the Y-axis direction.

Figure 6B:
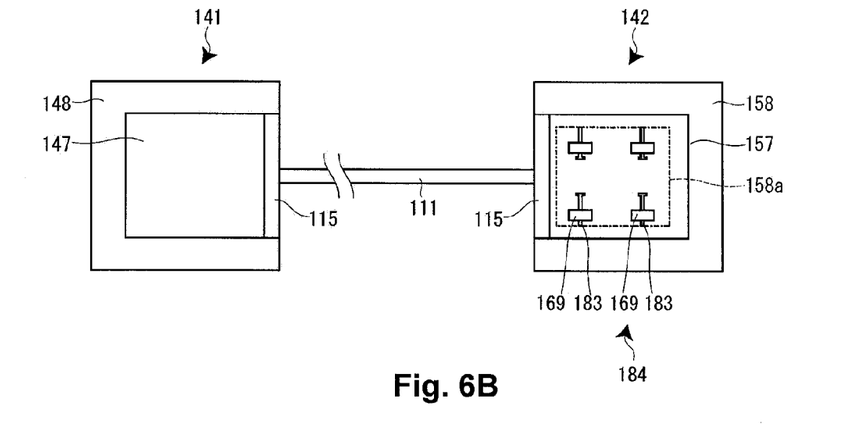

In this state, as illustrated in FIG. 6B, the θ-adjusting screws 183 of the θ adjustment sections 184 are rotated forward or reverse and the right base plate 157 is moved minutely in the X-axis direction in relation to the left base plate 147, whereby the carriage guide 111 is rotated in the θ direction. This makes it possible to eliminate the tilting of the carriage guide 111 commensurate with the angle 13, and makes it possible to make adjustments so that the direction of extension of the carriage guide 111 in the θ direction is the Y-axis direction, i.e., forms a 90° angle in relation to the X-axis direction (the feed direction).

Respectively rotating the correcting screws 181 and the θ-adjusting screws 183 forward or reverse as appropriate on the lower surface of the right base plate 157 in this manner makes it possible to correct the bending of the carriage guide 111 and to adjust the direction of extension of the carriage guide 111 in relation to the X-axis direction (θ adjustment). For this reason, the correcting of the bending and the θ adjustment of the carriage guide 111 can be carried out by similar operations and in one place, and operability can be improved. The θ adjustment sections 184, too, can also be provided to the left base plate 147, thus allowing for an operation for θ adjustment to be carried out on both the left and right sides.

Figures 7A, 7B:
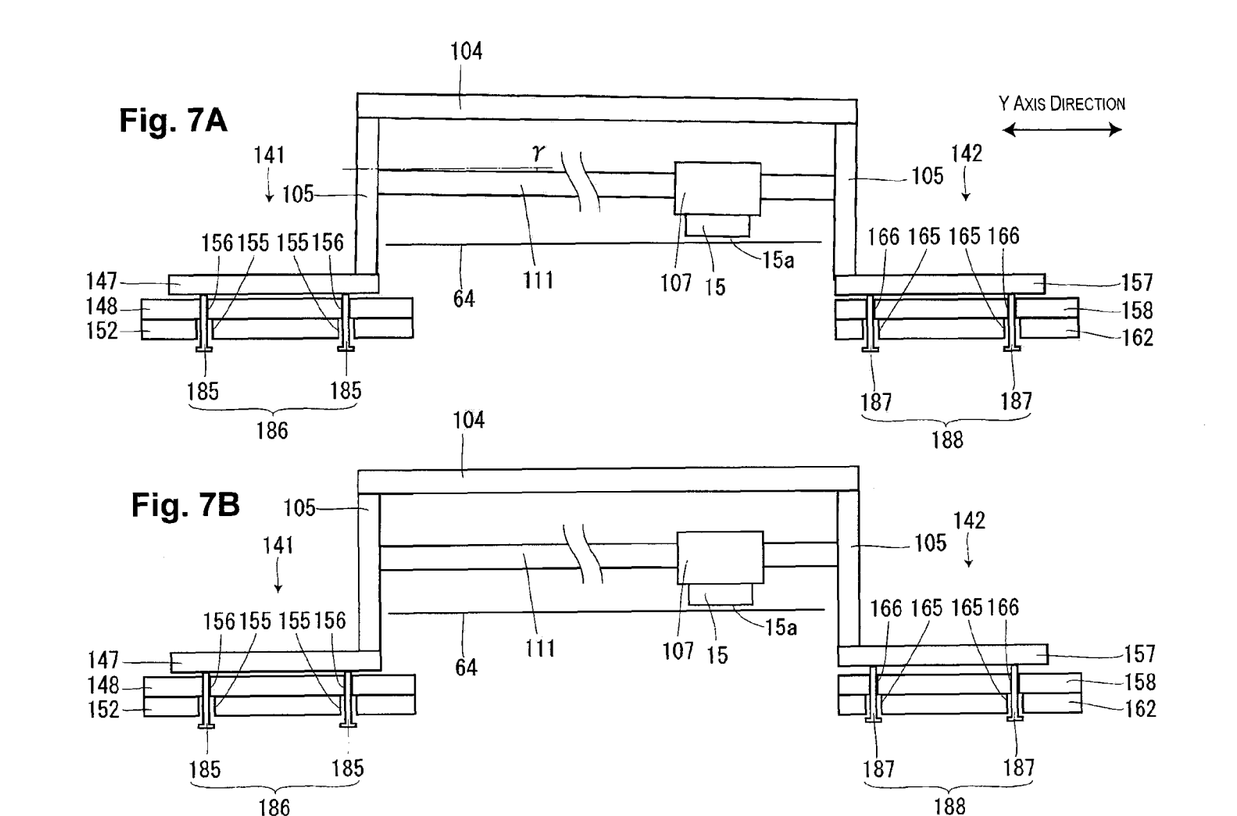

Next, adjustment of the parallelism of the carriage guide 111 in relation to the surface of the conveyance belt 64 (the plane of the feed path 3) in the Y-axis direction (Y-axis parallelism adjustment) by the right parallelism adjustment section 188 shall now be described, with reference to FIGS. 7A and 7B. FIG. 7A, similarly with respect to FIG. 5A, illustrates a state where the print section 5 has been placed on the left support section 141 and the right support section 142, and the left placement plate 148 has been fixed to the horizontal board 152 of the left bracket section 151. In FIG. 7A, the carriage side is tilted commensurate with an angle γ in relation to the surface of the carriage belt 64 in the Y-axis direction, with the left side higher than the right side.

In this state, as illustrated in FIG. 7B, the height-adjusting screws 187 of the right parallelism adjustment section 188 are screwed in and the right base plate 157 is lifted in relation to the left base plate 147. This makes it possible to eliminate the tilting of the carriage guide 111 commensurate with the angle γ, and makes it possible to render the carriage guide 111 parallel to the surface of the conveyance belt 64. As such, the paper gap can be rendered constant in the Y-axis direction (the main scanning direction of the inkjet head 15). It is also possible to make adjustments so that the nozzle surface 15a of the inkjet head 15 is parallel to the surface of the conveyance belt 64. The Y-axis parallelism adjustment can also be carried out by the left parallelism adjustment section 186. Indeed, use of the right parallelism adjustment section 188 makes it possible to carry out same on the right support section 142 side, as the correction of bending and the θ adjustment are carried out.

Figure 8A:
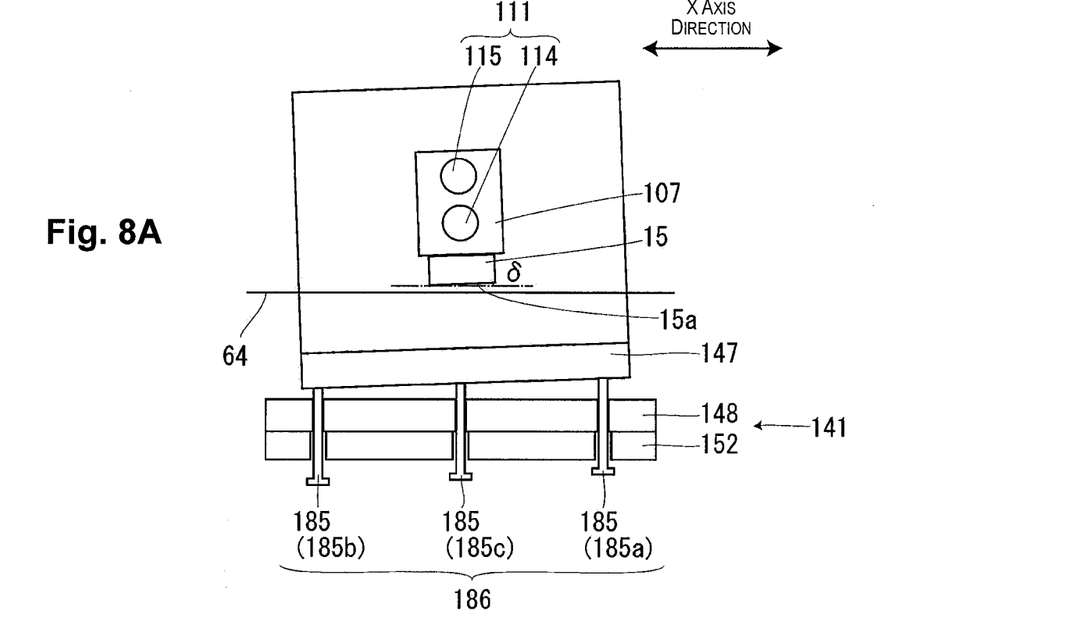

Next, adjustment of the parallelism of the nozzle surface 15a in relation to the surface of the conveyance belt 64 (the plane of the feed path 3) in the X-axis direction (X-axis parallelism adjustment) by the left parallelism adjustment section 186 and the right parallelism adjustment section 188 shall now be described, with reference to FIGS. 8A and 8B. FIG. 8A, similarly with respect to FIG. 5A, illustrates a state where the print section 5 has been placed on the left support section 141 and the right support section 142, but herein, the left placement plate 148 has not been fixed to the horizontal board 152 of the left bracket section 151, and similarly with respect to the right placement plate 158, can be moved minutely in relation to the horizontal board 152 of the left bracket section 151. In FIG. 8A, the upstream side of the nozzle surface 15a in the feed direction has a greater paper gap than does the downstream side. In other words, the nozzle surface 15a is tilted commensurate with an angle δ in relation to the surface of the conveyance belt 64. Of the left horizontal adjustment section 186 and the right parallelism adjustment section 188, however, FIGS. 8A and 8B illustrate only the left parallelism adjustment section 186.

Figure 8B:
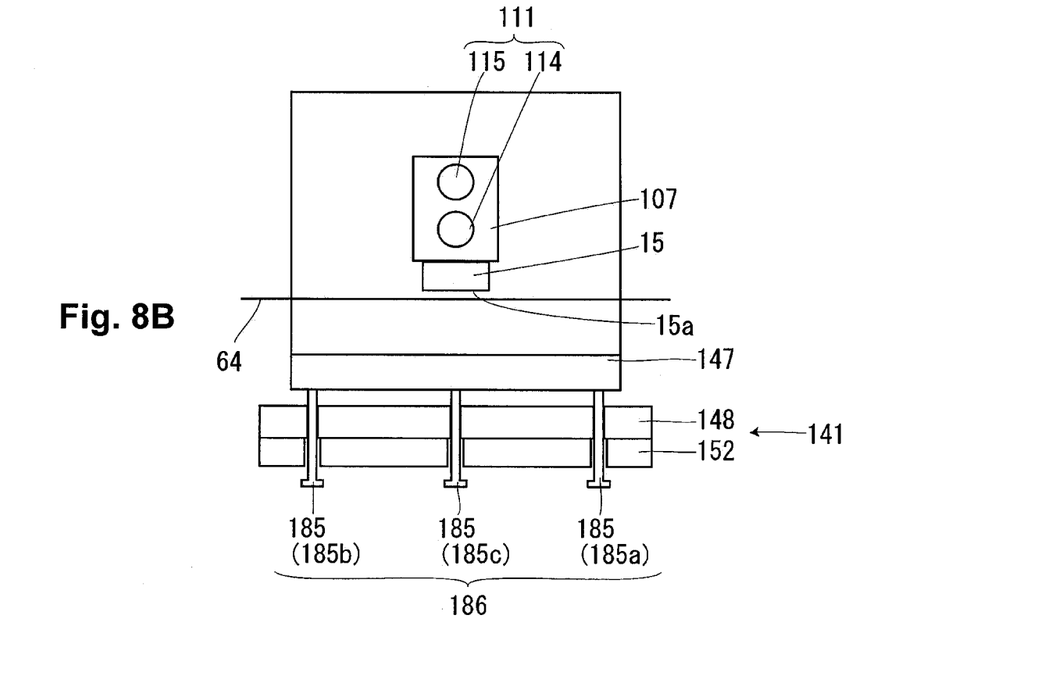

In this state, as illustrated in FIG. 8B, the height-adjust screws 185 of the left parallelism adjustment section 186 are rotated forward or reverse to adjust the angle of the left base plate 147 in relation to the left placement plate 148, and also the angle of the right base plate 157 in relation to the right placement plate 158 is adjusted by the right parallelism adjustment section 188, so that the nozzle surface 15a becomes parallel to the surface of the conveyance belt 64 in the X-axis direction. This makes it possible not only to make adjustments in the Y-axis direction, described above, but also to make adjustments in the X-axis direction, too, so that the nozzle surface 15a is parallel to the surface of the conveyance belt 64. Depending on the extent of tilting by the nozzle surface 15a, the X-axis parallelism adjustment can be carried out with only one of either the left parallelism adjustment section 186 or the right parallelism adjustment section 188.

Once the correction of bending, the θ adjustment, the Y-axis parallelism adjustment, and the X-axis parallelism adjustment have been completed, the right placement plate 158 is fixed to the horizontal board 162 of the right bracket section 161 (in cases where the X-axis parallelism adjustment has been carried out, the left placement plate 148 is also fixed to the horizontal board 152 of the left bracket section 151).

As stated above, according to the inkjet recording device 1 of the present embodiment, being provided with the leg movement sections 182 makes it possible to correct bending of the carriage guide 111 even in a case where the rigidity of the print section 5 is low, and therefore makes it possible to achieve a paper gap that is constant in the main scanning direction of the inkjet head 15. The invention could also be applied to a so-called line printer, or a printer of such a type that the inkjet head 15 is moved in the X- and Y-directions (the main scanning direction and a secondary scanning direction).

What is claimed is:

1. An inkjet recording device, comprising:
   a print section having a pair of leg sections configured and arranged to support by bilateral anchoring, via a head support member, an inkjet head for printing onto a recording medium, one of the pair of leg sections being movable and the other one of the pair of leg sections being fixed; and
   a leg movement section which is provided to the one of the pair of leg sections, the leg movement section being configured and arranged to move the one of the pair of leg sections toward the other one of the pair of leg sections in a direction of extension of the head support member.

2. The inkjet recording device as set forth in claim 1, further comprising:
   a medium feed mechanism configured and arranged to feed the recording medium along a feed path; and
   a θ adjustment section that is provided to at least one of the pair of leg sections, the θ adjustment section being configured and arranged to move the one leg section to the other leg section in the feed direction to adjust the direction of extension of the head support member in relation to the feed direction.

3. The inkjet recording device as set forth in claim 2, further comprising
a pair of support sections configured and arranged to support the pair of leg sections,
the leg movement section and the θ adjustment section alike being provided to the one leg section, one of the support sections including a placement plate on which the one leg section is placed and in which an adjustment opening is formed,
the leg movement section including
a correcting block projecting out at a lower surface of the leg section and
a correcting screw which is screwed into the correcting block so as to perforate through in a direction orthogonal to the feed direction and a distal end of which comes to an end at an edge inner surface of the adjustment opening, and
the θ adjustment section including
a θ-adjusting block projecting out at the lower surface of the leg section and
a θ-adjusting screw which is screwed into the θ-adjusting block so as to perforate through in the feed direction and a distal end of which comes to an end at the edge inner surface of the adjustment opening.

4. The inkjet recording device as set forth in claim 3, further comprising:
a parallelism adjustment section which is provided to at least one of the pair of leg sections and moves the one leg section in a height direction in relation to the other leg section to adjust the parallelism of the head support member in relation to the plane of the feed path.

5. The inkjet recording device as set forth in claim 4, wherein
each of the support sections includes a placement plate on which the leg section is placed, and
the parallelism adjustment section includes a height-adjusting screw which is screwed so as to perforate through the placement plate in the vertical direction and an upper end of which comes to an end at the lower section of the leg section.

6. The inkjet recording device as set forth in claim 5, wherein
the parallelism adjustment section is provided to both of the pair of leg sections, and
each of the parallelism adjustment sections includes a plurality of the height-adjusting screws provided to a plurality of points spread out in the feed direction of the recording medium.

7. An inkjet recording device, comprising:
a print section having a pair of leg sections configured and arranged to support by bilateral anchoring, via a head support member, an inkjet head for printing onto a recording medium, one of the pair of leg sections being movable and the other one of the pair of leg sections being fixed; and
a leg movement section configured and arranged to move the one of the pair of leg sections in a direction of extension of the head support member so as to cause a bending moment to act on the head support member, via the one of the pair of leg sections, and correct for a bending of the head support member having been bent.

* * * * *